United States Patent Office 3,644,388
Patented Feb. 22, 1972

---

3,644,388
PROCESS FOR MAKING 2,3,5-TRICHLORO-4-PYRIDINOL
Clive Dudley Spencer Tomlin, Maidenhead, and Anil Sunderji Mangalji, Loughborough, England, assignors to Imperial Chemical Industries Limited, London, England
No Drawing. Filed Feb. 16, 1970, Ser. No. 11,823
Claims priority, application Great Britain, Feb. 25, 1969, 9,954/69
Int. Cl. C07d *31/30*
U.S. Cl. 260—297 R
6 Claims

ABSTRACT OF THE DISCLOSURE

A process for preparing 4-hydroxy-2,3,5-trichloropyridine, which consists essentially of reacting 4-hydroxy-2,3,5,6-tetrachloro pyridine or an alkali or alkaline earth metal salt thereof which an alkyl-lithium compound in which the alkyl group has 1 to 6 carbon atoms in a liquid diluent at a temperature of up to 20° C. and hydrolizing the resulting product. The compound produced by this process is commercially known as "pyriclor" an effective pre-emergence and post emergence herbicide against a variety of grasses and broadleaf herbs.

---

This invention relates to a process of preparing the herbicidal compound 4 - hydroxy-2,3,5-trichloropyridine, which has the common name pyriclor.

According to the present invention there is provided a process of preparing 4 - hydroxy-2,3,5-trichloropyridine, which comprises reacting 4 - hydroxy-2,3,5,6-tetrachloropyridine or a salt thereof with an alkyl lithium in a liquid diluent at a temperature of up to 20° C., and hydrolysing the resulting product.

Preferably the alkyl-lithium is one in which the alkyl group has from 1 to 6 carbon atoms.

A particularly preferred alkyl-lithium is butyl-lithium.

Conveniently the liquid diluent comprises an ether. Preferably the ether is one in which the reactants are at least partially soluble. Suitable ethers include the dialkyl ethers, particularly those having alkyl groups of 1 to 4 carbon atoms, for example diethyl ether, the alkyl ethers of ethylene glycol and diethylene glycol, particularly those having alkyl groups of 1 to 4 carbon atoms, and tetrahydrofuran. Further suitable ethers include the dioxans.

The reaction is carried out at a temperature which is sufficiently low to prevent undesirable side reactions, for example, decomposition of the intermediate reaction product. A convenient temperature is from 0° C. to —65° C., preferably from —50° C. to —65° C.

In order that the process may be more clearly understood, a reaction scheme illustrating the process using butyl-lithium is given below, although we do not wish to be limited by any particular theory as to the mechanism of the reaction.

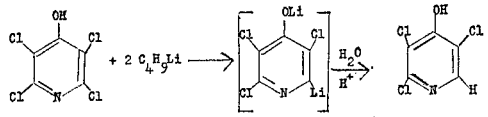

It will be seen that of the two molar proportions of butyl-lithium used in the reaction with 4-hydroxytetrachloropyridine, one is consumed in forming the lithium salt of the 4 - hydroxytetrachloropyridine. When a salt of 4-hydroxytetrachloropyridine is used as starting material in the reaction, only one molar proportion of butyl-lithium is theoretically required. Suitable salts for use in the reaction include for example alkali metal and alkaline-earth metal salts of 4 - hydroxytetrachloropyridine. Preferred salts are the lithium, sodium, and potassium salts.

The reaction is preferably carried out with exclusion of oxygen, for example by maintaining an atmosphere of an inert gas in the reaction vessel, in order to avoid the formation of byproducts. Although the reaction medium is preferably an ether, a proportion of another inert solvent can be tolerated in the reaction mixture. Thus butyl-lithium may be introduced into the reaction as a solution in hexane. This is advantageous since alkyl-lithium compounds are conveniently stored as solutions in hydrocarbon solvents, such solutions deteriorating less rapidly than solutions in dialkyl ethers.

The invention will now be illustrated by the following examples.

EXAMPLE 1

A solution of 4-hydroxytetrachloropyridine (11.65 g., 0.05 M) in dry ether was cooled to —60° C. under an atmosphere of dry nitrogen. Butyl-lithium in hexane (47 ml., 0.10 M) was then added dropwise. The reaction was exothermic and the rate of addition was regulated so as to keep the temperature at or below —60° C. When addition was complete the reaction mixture was kept at —60° C. to —50° C. for 4 hours. Water (15 ml.) was then added to the reaction mixture, followed by sulphuric acid (10 ml. of a 2 N solution). The mixture was allowed to warm to room temperature; it was then made acid with sulphuric acid, and the ethereal layer separated. The aqueous layer was extracted with ether (2 × 50 ml.), and the combined ethereal extracts were dried and evaporated. The solid residue was recrystallised from a mixture of benzene and ethanol and then from a mixture of ethanol and water to give 4-hydroxy-2,3,5-trichloropyridine (4.25 g., 43%) identified by its melting point (212–214° C.) and mixed melting point (212–214° C.) with authentic 4-hydroxy-2,3,5-trichloropyridine (M.P. 216° C.). The infrared spectrum of the product of this example was also identical with that of a sample of authentic 4-hydroxy-2,3,5-trichloropyridine.

A quantity (3.5 g.) of the tetrachlorinated starting material was obtained on working up the liquors from the recrystallisation of the product.

EXAMPLE 2

Experiments were conducted using the procedure described in Example 1, but using the reactants and reaction conditions set forth in the table below. In each case 4-hydroxy-2,3,5-trichloropyridine was obtained, as shown by the infra-red and nuclear magnetic resonance spectra of the product.

| Reactants | | Solvent | Reaction temperature, ° C. | Reaction time, hours |
|---|---|---|---|---|
| HP | C₄H₉Li | Ether | —30 | 5 |
| HP | C₄H₉Li | do | —20 | 3½ |
| HP | C₄H₉Li | 1,4-dioxan | <20 | ½ |
| HP | C₄H₉Li | Tetrahydrofuran | —20-—40 | 5½ |
| HP | C₂H₅Li | Ether | 0 | 3 |
| HP | C₃H₇Li | do | 0-10 | 3 |
| HP | C₆H₁₃Li | do | 0 | 4 |
| HP¹ | C₄H₉Li | do | —10-0 | 5 |
| HP² | C₄H₉Li | do | —5-0 | 5½ |

¹ Potassium salt. ² Lithium salt.
NOTE.—The abbreviation HP refers to 4-hydroxytetrachloropyridine.

What is claimed is:

1. A process for preparing 4-hydroxy-2,3,5-trichloropyridine, which consists essentially of reacting 4-hydroxy-2,3,5,6-tetrachloropyridine or an alkali metal or alkaline earth metal salt thereof, with an alkyl-lithium wherein the alkyl group has from 1 to 6 carbon atoms in a liquid diluent at a temperature of up to 20° C. and hydrolysing the resulting product.

2. A process as claimed in claim 1 in which the alkyl-lithium used is butyl-lithium.

3. A process as claimed in claim 1 in which the diluent comprises an ether.

4. A process as claimed in claim 1 in which the alkyl-lithium is introduced into the reaction mixture in the form of a solution in a hydrocarbon solvent.

5. A process as claimed in claim 1 wherein the reaction is carried out at a temperature of −65° C. to 0° C.

6. 4-Hydroxy-2,3,5-trichloropyridine when prepared according to the process of claim 1.

References Cited

UNITED STATES PATENTS 3,249,419   5/1966   Martin _____ 71—94

OTHER REFERENCES

Screttas et al., J. Am. Chem. Soc., 87(14) pps. 3276–7, (1965).

ALAN L. ROTMAN, Primary Examiner

U.S. Cl. X.R.

71—94